United States Patent Office 3,342,783
Patented Sept. 19, 1967

3,342,783
PROCESS FOR THE MANUFACTURE OF POLY-
AMIDES FROM α,α-DIALKYL SUBSTITUTED
β-LACTAMS
Paul Schlack, Leitershofen, near Augsburg, Harald Jensen, Frankfurt am Main, and Gerhard Lohaus, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Apr. 1, 1963, Ser. No. 269,723
Claims priority, application Germany, Apr. 6, 1962,
F 36,480
8 Claims. (Cl. 260—78)

The present invention relates to the manufacture of linear polyamides carrying amide groups in β-position.

It is known that lactams having more than 6 ring members, for example ε-caprolactam, can be polymerized to high molecular weight polyamides when they are heated to a temperature above 200° C. with water or other reagents having a solvolytic action on the lactam, including also, for example, reagents splitting off water under the reaction conditions. In this reaction the substituents on the lactam ring have a pronounced stabilizing action, i.e. they reduce the tendency of the lactams to polymerize. The addition of a methyl group on any carbon atom of the caprolactam ring, for example, strongly reduces the tendency of the caprolactam to polymerize and the addition of a second methyl group fully abolishes this tendency. (Cf. A. Schäffler and W. Ziegenbein, Ber. 88, page 1374 (1955), W. Zeigenbein, A. Schäffler and R. Kaufhold, Ber. 88, page 1906 (1955).)

Hitherto, it has not been possible to transform lactams having 5 or 6 ring members, i.e. α-pyrrolidone and α-piperidone or the substitution products thereof, into polyamides under the aforesaid conditions, that is to say the conditions of a so-called condensation or hydrolytic polymerization.

It is also known to produce polyamides carrying amide groups in β-position by polycondensing β-aminocarboxylic acids having two substituents in α-position to the carboxyl group. However, this process must be carried out either at high reaction temperatures or with very long reaction times (cf. U.S. Patent 2,500,317). Moreover, this process only yields products having a very low degree of polymerization which are unsuitable in practice for the manufacture of fibers and films.

It has also been proposed to produce polyamides carrying amide groups in β-position by condensation polymerization of β-lactams having at least one hydrogen atom in α-position to the carbonyl group. The processing of the polymers thus obtained involves, however, considerable difficulties because most of them decompose on melting and are soluble in a very few solvents only without degradation.

It has now been found that linear polyamides carrying amide groups in β-position can be obtained by polymerizing or copolymerizing β-lactams, the nitrogen atoms of which are free from substituents other than hydrogen, at a temperature in the range of from 50° to 300° C., if desired in the presence of one or several catalysts of insufficient basicity to remove hydrogen from the nitrogen atom of said beta-lactams, when β-lactams are used which have, in α-position to the carbonyl group, two alkyl radicals having together at most 5 carbon atoms, which radicals together may be members of an alicyclic ring of 4, 5 or 6 members, and which β-lactams have, in β-position, at most one alkyl radical having at most 3 carbon atoms. The β-lactams can be polymerized either alone or in admixture with other compounds capable of forming linear polyamides.

Suitable lactams which can be polymerized by the process of the invention are, for example, α,α-dimethylpropiolactam, aminopivalic acid lactam, α,α-diethylpropiolactam, α-methylpropiolactam, α-butyl-propiolactam, α,α-tetramethylene - propiolactam, α,α-pentamethylene-propiolactam, α,α,β - trimethyl-propiolactam, α,α-dimethyl-β-isopropyl-propiolactam.

In contradistinction to the polymers of β-lactams having at least one hydrogen atom in α-position to the carbonyl group, the polyamides produced by the process of the invention can be processed from a melt into fibers and films without noteworthy degradation taking place. Moreover, it is possible to shape the polyamides from solutions. In the latter case, too, the polyamides of the invention offer advantages over the β-polyamides having at least one hydrogen atom in α-position to the carbonyl group. They are not decomposed, for example, by organic acids such as formic acid, acetic acid, dichloroacetic acid. Thus the small number of suitable solvents for these polyamides is considerably increased.

It could not be expected that the β-lactams can be readily polymerized by the process of the present invention since it has been found that α,α-β-trimethyl-β-butyrolactam, i.e. a β-lactam carrying two methyl groups each in α-position and in β-position to the carbonyl group, cannot be polymerized under the conditions of the present process and only yields monomeric degradation products when the temperature is further increased.

The polymerization can be initiated by merely heating the reaction mixture to a temperature above about 180° C., but in this case rather long periods of reaction are required. The polymerization can be substantially accelerated by the addition of suitable catalysts. Suitable catalysts are, above all, compounds having acid hydrogen atoms. Such compounds include, for example water or compounds splitting off water such as δ-hydroxybutyric acid; alcohols such as methanol, butanol, benzyl alcohol; carboxylic acids such as acetic acid, adipic acid, isophthalic acid; hydroxycarboxylic acids such as ω-hydroxycaproic acid and 4-β-hydroxyethoxybenzoic acid; amines such as benzyl amine, hexamethylene diamine, aminocarboxylic acids such as γ-amino-butyric acid, ω-aminododecanoic acid; acid amides such as acetamide, sebacic acid diamide, methyl-benzamide; acid anhydrides; carboxylic acid esters; mineral acids; especially hydrohalic acids and the salts thereof with weak bases; Lewis acids such as boron trifluoride, aluminum chloride and inorganic acid halides such as phosphorus oxychloride, thionyl chloride; salts of amines with strong acids, such as dodecylaminohydrobromide, hexamethylene-diamino-hydrochloride, aminocaproic acid hydrochloride. It should be taken into consideration that compounds in which the carboxyl groups and amino groups carrying hydrogen atoms are not present in equivalent amounts act as viscosity stabilizers and affect the average molecular weight of the polymer. They should, therefore, be used in only a relatively small amount when products of a high degree of aminocaproic acid hydrochloride. It should be taken into these compounds in an amount of about 0.01 to 5 mol percent, perferably 0.1 to 1 mol percent, calculated on the monomeric lactam.

The conditions are different with catalysts containing equivalent amounts of amino and carboxyl groups, for example ε-aminocaproic acid, ω-aminocaprylic acid, ω-aminoundecanoic acid, the adipic acid salt of hexamethylene diamine and the sebacic acid salt of tetramethylene diamine. These compounds form real copolymers with the β-lactams and can, therefore, be added in catalytic amounts and also in larger amounts, for example in an amount of up to 50% and more. In the latter case, the properties of the polyamides may be substantially modified by the copolymerization, above all with respect to the melting point and solubility. This possible modification of the properties of the polymers makes the process of the invention especially interesting.

Instead of the aforesaid ω-aminocarboxylic acids, the lactams thereof, particularly the lactams of ω-aminocarboxylic acids having at least five carbon atoms between the amino group and the carboxyl group, can be used in the copolymerization if the polymerization is initiated by the addition of small amounts of an accelerator. Under these conditions, also those β-lactams which carry at least one hydrogen atom in α-position to the carbonyl group can be used in the copolymerization.

Polymers having special properties are likewise obtained when polyfunctional initiators are used, for example polyamines such as polyethylene imine or polycarboxylic acids or the derivatives thereof, such as polyacrylic acid, polymethacrylic acid, copolymers of acrylic acid and vinyl-pyrrolidone, copolymers of styrene and maleic anhydride and the like. The polymerization products thus obtained can be rendered insoluble and infusible by a chemical aftertreatment.

An especially pronounced accelerating effect is obtained by the use of carboxylic acid chlorides, such as acetyl chloride, oxalyl chloride, adipic acid dichloride, benzoyl chloride. Catalysts of this type enable the polymerization of the aforesaid β-lactams to be initiated at a temperature as low as about 50° C.

In some cases it may be advantageous to start the polymerization at low temperatures, for example 100 to 150° C., and to terminate the reaction by heating the reaction mixture to a temperature of up to 300° C., preferably in the range of 180 to 250° C. At the beginning of the polymerization it is sometimes of advantage to operate in a closed apparatus, above all when readily volatile catalysts are used. At the end of the reaction the application of subatmospheric pressure may give better results with respect to the reaction time and the degree of polymerization.

Although the polyamides produced by the process of the invention are relatively stable to oxygen, it is suitable to perform the polymerization at a temperature above about 200° C. under an inert protective gas, for example nitrogen or hydrogen.

The polymerization of the β-lactams in accordance with the invention can be carried out either in bulk or in solution. Suitable solvents are compounds having a sufficiently high boiling point, such as phenol, chlorophenol, m-cresol, hexamethyl-phosphoric acid amide, dimethyl-sulfoxide, N-methylpyrrolidone. Other solvents include hydrocarbons as tetrahydronaphthalene, methylnaphthalene; halohydrocarbons such as dichlorobenzene, trichlorobenzene, chloronaphthalene; ethers such as diphenyl ether, diphenylene oxide; nitro compounds such as nitrobenzene, nitronaphthalene; sulfones such as tetramethylene sulfone and the like.

The polyamides obtained by the process of the invention are valuable starting products for the manufacture of fibers, films and coating materials.

The following examples serve to illustrate the invention but they are not intended to limit it thereto, the parts being by weight. The relative viscosity has been determined at 20° C. with a 1% solution of the polymer in concentrated sulfuric acid.

*Example 1*

A solution of 1 part of sebacic acid in 450 parts of amino-pivalic acid lactam was heated for 150 minutes at 190° C. A polyamide was obtained in the form of an opaque colorless block. The product had a relative viscosity of 2.5 and a melting point of about 255° C. The molten polyamide had good fiber-forming properties. The product was soluble in phenol, formic acid, hexamethylphosphoric acid amide and trifluorethanol.

*Example 2*

1 part of the adipic acid salt of hexamethylene diamine was dissolved in 30 parts of aminopivalic acid lactam while heating and the solution was heated for 90 minutes at 170° C.

The polyamide obtained had a relative viscosity of 2.1 and a melting point of about 260° C. The molten product had good fiber-forming properties.

*Example 3*

A mixture of 2 parts of aminopivalic acid lactam and 1 part of ω-aminoundecanoic acid was heated at atmospheric pressure for 10 minutes at 190–200° C. and then under a pressure of 1 mm. of mercury for 60 minutes at 250° C. A colorless transparent copolymer was obtained which had good fiber-forming properties. Cast from solutions, the polymer yielded firmly adhering coatings.

*Example 4*

A mixture of 1 part of adipic acid, 300 parts of aminopivalic acid lactam and 200 parts of tetramethylene sulfone was heated for 240 minutes at 200° C. The reaction mixture was mechanically comminuted, boiled with water and acetone and dried under reduced pressure at 80° C. 290 parts of polyamide were obtained having a relative viscosity of 1.9.

*Example 5*

A mixture of 50 parts of aminopivalic acid lactam, 50 parts of chlorobenzene and 1 part of adipic acid dichloride was heated for 60 minutes at 80° C. By suction-filtration and boiling with acetone, 44 parts of polyamide were obtained having a relative viscosity of 1.4.

*Example 6*

A mixture of 1 part of sebacic acid, 67 parts of β-methyl-β-butyrolactam and 133 parts of aminopivalic acid lactam was heated for 120 minutes at 200° C., while passing over pure nitrogen. At said temperature a very viscous resin was obtained which solidified on cooling to a hard transparent mass and which had good fiber-forming properties. Solutions of the copolymer thus obtained, for example in acetone, yielded firmly adhering coatings on drying.

*Example 7*

A mixture of 1 part of sebacic acid, 300 parts of α,α-dimethyl-β-butyrolactam and 200 parts of tetramethylene sulfone was heated for 180 minutes at 190° C. while passing over nitrogen. The reaction mixture was processed as described in Example 4. 220 parts of a polyamide were obtained which had a melting point above 350° C. and a relative viscosity of 1.35.

*Example 8*

A mixture of 200 parts of aminopivalic acid lactam, 130 parts of tetramethylene sulfone and 1 part of hexamethylene diamine was heated for 180 minutes at 200° C. while passing over nitrogen. 185 parts of a polyamide were obtained having a relative viscosity of 2.1.

We claim:
1. A process for the manufacture of a linear polyamide having amide groups in β-position, which process comprises polymerizing, at a temperature in the range from 180° C. to 300° C., a β-lactam free of substituents other than hydrogen at the nitrogen atom and having two alkyl groups in the α-position to the carbonyl group and at most one alkyl group in the β-position, said alkyl groups in the α-position having together at most 5 carbon atoms, and said alkyl group in the β-position having at most 3 carbon atoms.

2. A process as in claim 1 wherein said lactam is aminopivalic acid lactam.

3. A process as in claim 1 wherein said β-lactam is polymerized in the presence of at least one catalyst which is of insufficient basicity to remove hydrogen from the nitrogen atom of said β-lactam.

4. A process as in claim 1 wherein said β-lactam is copolymerized with a lactam of an ω-carboxylic acid having at least 5 carbon atoms between the carboxyl group and the amino group.

5. A process as in claim 1 wherein said β-lactam is polymerized in a solvent selected from the group consisting of phenol, chlorophenol, m-cresol, hexamethyl-phosphoric acid amide, dimethylsulfoxide, N-methyl pyrrolidone, tetrahydronaphthalene, methylnaphthalene, dichlorobenzene, trichlorobenzene, chloronaphthalene, diphenyl ether, diphenylene oxide, nitrobenzene, nitronaphthalene, and tetramethylene sulfone.

6. A process as in claim 1 wherein said β-lactam is copolymerized with a polyamide-forming compound selected from the group consisting of ε-aminocaproic acid, ω-aminocaprylic acid, ω-aminoundecanoic acid, the adipic acid salt of hexamethylene diamine, and the sebacic acid salt of tetramethylene diamine.

7. A process as in claim 6 wherein said β-lactam is polymerized in the presence of at least one catalyst which is of insufficient basicity to remove hydrogen from the nitrogen atom of said β-lactam.

8. A process as in claim 6 wherein said β-lactam and polyamide-forming compound are copolymerized in a solvent selected from the group consisting of phenol, chlorophenol, m - cresol, hexamethyl - phosphoric acid amide, dimethyl sulfoxide, N-methyl pyrrolidone, tetrahydronaphthalene, methylnaphthalene, dichlorobenzene, trichlorobenzene, chloronaphthalene, diphenyl ether, diphenylene oxide, nitrobenzene, nitronaphthalene, and tetramethylene sulfone.

References Cited
UNITED STATES PATENTS

| | | | |
|---|---|---|---|
| 3,093,618 | 6/1963 | Graf et al. | 260—78 |
| 3,211,706 | 10/1965 | Borner et al. | 260—78 |

WILLIAM H. SHORT, *Primary Examiner.*

H. D. ANDERSON, *Assistant Examiner.*